INVENTOR.
R. A. Crowley
F. L. LeBus, Sr.
BY
William S. Dorman
ATTORNEY

INVENTOR.
R. A. Crowley
F. L. LeBus, Sr.
BY

William S. Dorman

ATTORNEY

INVENTOR.
R. A. Crowley
BY F. L. LeBus, Sr.

ATTORNEY

INVENTOR.
R. A. Crowley
F. L. LeBus, Sr.
BY
William S. Dorman
ATTORNEY

Nov. 12, 1963 R. A. CROWLEY ET AL 3,110,096
METHOD OF GROOVING A CABLE SPOOLING DRUM
Filed Dec. 18, 1961 5 Sheets-Sheet 5

INVENTOR.
R. A. Crowley
BY F. L. LeBus, Sr.

William S. Dorman

ATTORNEY

United States Patent Office 3,110,096
Patented Nov. 12, 1963

3,110,096
METHOD OF GROOVING A CABLE SPOOLING DRUM
Robert A. Crowley and Franklin L. Le Bus, Sr., Longview, Tex., assignors to Le Bus Royalty Company, Longview, Tex., a partnership
Filed Dec. 18, 1961, Ser. No. 160,210
15 Claims. (Cl. 29—416)

This invention relates to improvements in cable spooling apparatus and more particularly, but not by way of limitation, to a method of providing a continuous combined parallel and helical circumferential groove around the outer periphery of a cable spooling drum.

In the spooling of multiple layers of cable or line onto a drum core, it is important to control the winding of the initial layers to provide a true and even winding thereof in order to maintain any control whatsoever over the outer winds or layers of the cables. Many systems have been introduced to improve the winding of the initial layers onto the drum cores, particularly in cable spooling operations requiring many layers of the cable to be overlaid on the drum. For example, the drum core is often provided with a continuous spiral or helical groove extending between the drum flanges for receiving the initial layer of the cable. This type of grooving has many disadvantages, however, in that the second layer, and succeeding layers of the cable must wrap around the drum in an opposite longitudinal direction from the first wind, and considerable chafing of the cable, and irregular spacing between the wraps of the layer frequently occur.

A counterbalanced cable spooling system for providing a true and efficient winding of multiple layers of cable on a drum core has been developed by Franklin L. Le Bus, Sr., as disclosed in various Le Bus Prior art patents, such as United States Letters Patent No. 2,620,996, issued December 9, 1952, entitled "Cable Winding Apparatus"; No. 2,708,080, issued May 10, 1955, and entitled "Hoisting Drum"; No. 2,732,150, issued January 24, 1956, and entitled "Balanced Cable Spooling"; and No. 2,734,695, issued February 14, 1956, and entitled "Balanced Cable Spooling." The spooling system developed by the aforementioned patents has substantially eliminated the disadvantages of prior grooving systems. Consequently, the counterbalanced spooling has greatly advanced the cable spooling art and has met with wide acceptance in hoisting industry of all types.

The Le Bus counterbalanced spooling system utilizes a drum core grooving design comprising a continuous circumferential groove having alternate helical portions and straight or parallel portions to achieve the optimum control of the cable spooling operation. This combined helical and parallel grooving on the drum core is now usually accomplished in one of several methods. In some instances, a plurality of individual arcuate segments of groove bar are welded to the outer periphery of the drum core to provide the desired grooving pattern therefor. Of course, a drum core having the continuous helical or spiral groove already provided thereon must first be machined in order to remove the groove, or covered by a smooth sleeve, and the groove bars may then be welded to the plain or smooth surface. This grooving method has many disadvantages in that some drums are constructed of high carbon steel and cannot be welded. In addition, the welding of individual groove bars onto the outer periphery of the drum core requires a great deal of time, particularly on large drums such as used in mining, and the like. Even more time must be expended, of course, when it is necessary to machine off the old grooves, or add a plain sleeve prior to the welding of the groove bars on the drum core. Furthermore, expensive dies are needed for rolling the grooved bar in accordance with various cable or line diameters.

Another method of obtaining the counterbalanced grooving on a drum or winch is to provide a parallel grooved sleeve with blanked out or non-grooved cross-over areas or sections, or to fill the cross-over area with grooved bars. The system of blanked out cross-over areas has been used on large drum cores. However, one of the disadvantages of this system is a tendency to crush the cable or wire rope in the blanked out cross-over section during the winding of multiple layers of the cable on the drum. In the case of filling the blanked out cross-over areas with grooved bars, of course, the bars or segments must be fitted into the blanked out sections and welded therein. This is time consuming, and the welding operation is not entirely desirable, as hereinbefore set forth.

Perhaps the most frequently used counterbalanced grooving comprises a continuous circumferential groove having the alternate helical and parallel sections machined on the periphery of the core in a continuous grooving operation. However, it is difficult and expensive to machine this continuous combined helical and parallel groove on the drum core, and at present it is necessary to install a specially designed Geneva gearing attachment to a lathe in order to properly machine the groove on the drum. This lathe operation is not applicable to the larger sized drum, and as a result, a special attachment must be utilized with a vertical milling machine to efficiently groove the larger drums. These are expensive operations, and it is desirable to provide the combined helical and parallel grooving on the periphery of the drum core without the necessity of the special machine attachments.

The present invention contemplates a novel method of providing the Le Bus counterbalanced grooving on the core of a drum in a manner whereby the overall cost thereof is reduced to a minimum. The novel groove method comprises the grooving of a cylindrical sleeve with a plurality of parallel grooves, which may be accomplished in any well known manner, such as with the usual lathe, or usual milling machine, depending upon the size of the drum diameter. The parallel grooved sleeve is then cut in such a manner whereby the arcuate or semi-cylindrical portions may be severed from the grooved sleeve and arranged on the outer periphery of the drum core to provide the continuous combined helical and parallel grooves. The segments of the sleeve or "master cylinder" may be bolted or welded to the outer periphery of the drum core. Of course, there are relatively few segments to be secured to the drum core, and the attachment thereof requires relatively little time and effort as compared to the assembly of the plurality of individual groove bars, and the like. In addition, the alignment of the relatively few segments is a simple manner. The parallel grooved sleeve may be cut in a variety of patterns to provide a variety of types of the counterbalanced spooling groove on a drum core in accordance with the drum size and conditions required for the particular cable winding operation. The novel parallel grooved sleeve may be manufactured quickly and inexpensively by conventional machining processes, and may be attached to the drum core in a relatively few large pieces, thus reducing the assembly or application time to a minimum. In this manner, the Le Bus counterbalanced spooling grooves may be quickly and inexpensively provided on substantially any drum core.

It is an important object of this invention to provide a novel method of providing counterbalanced spooling grooves on a drum core.

It is another object of this invention to provide a method of providing counterbalanced spooling grooves on a drum core through the utilization of conventional machining processes.

Another object of this invention is to provide a method of grooving a drum core with a continuous circumferential groove having combined helical and parallel portions in a manner requiring a minimum of expense.

Still another object of this invention is to provide a method of grooving a drum core with a continuous circumferential groove having combined helical and parallel portions in a manner wherein the same method may be utilized for providing a variety of the helical and parallel patterns on the drum.

Still another object of this invention is to provide a novel method of providing a counterbalanced grooving on the periphery of the spooling drum and which is simple and efficient in operation.

Other and further objects and advantageous features of the present invention will hereinafter more fully appear in connection with a detailed description of the drawings in which.

Figure 1:
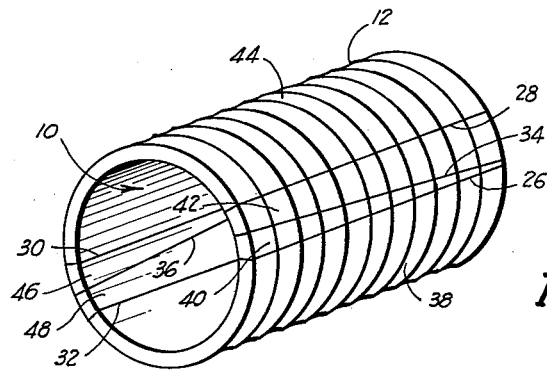
FIGURE 1 is a perspective view of a parallel grooved sleeve embodying the invention.

Referring to the drawings in detail, reference character 10 generally indicates a substantially cylindrical sleeve preferably of any suitable diameter corresponding to the diameter of a drum core (not shown) to be provided with a counterbalanced peripheral grooving. The outer periphery of the sleeve 10 is provided with a plurality of circumferentially parallel grooves 12 extending throughout the longitudinal length thereof, as clearly shown in FIGURES 1 and 4. The groove 12 may be machined or otherwise provided on the outer periphery of the sleeve 10 in any conventional manner, such as by a lathe, milling machine or the like. The parallel grooved sleeve thus becomes a "master cylinder" which may be utilized for providing a variety of counterbalanced grooving systems on the core of a drum in a manner as will be hereinafter set forth.

Conventional Rise Grooving System

Figure 4:
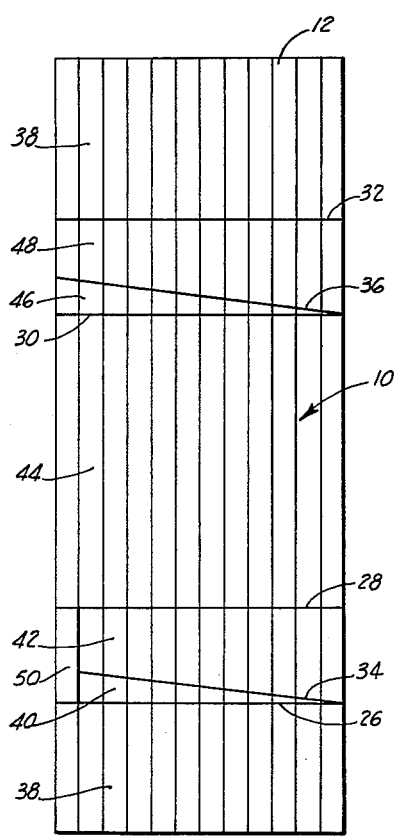
FIGURE 4 is an evolved plan view of a cylindrical sleeve embodying the invention.
Figure 5:
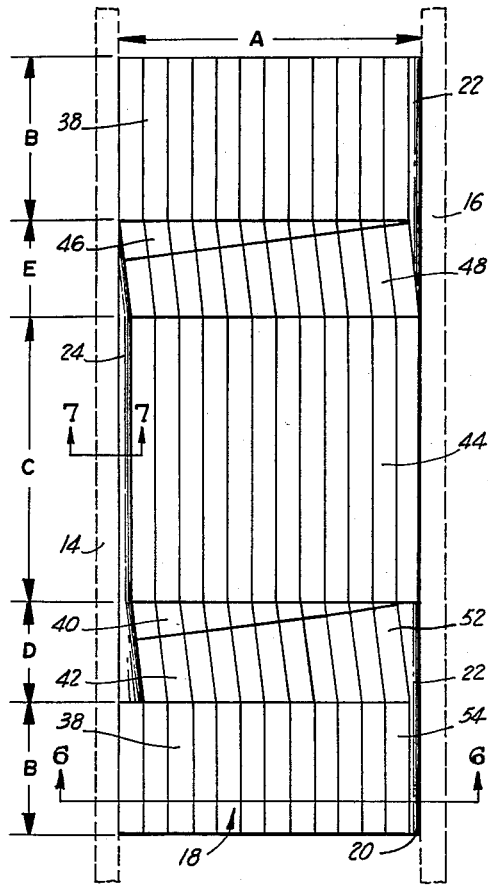
FIGURE 5 is an evolved plan view of a cable spooling drum having a counterbalanced grooving thereon as assembled from the embodiment depicted in FIGURE 4.
Figure 6:
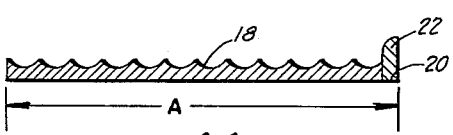
FIGURE 6 is a sectional view taken on line 6—6 of FIGURE 5.
Figure 7:
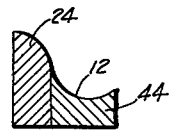
FIGURE 7 is a sectional view taken on line 7—7 of FIGURE 5.
Figure 8:
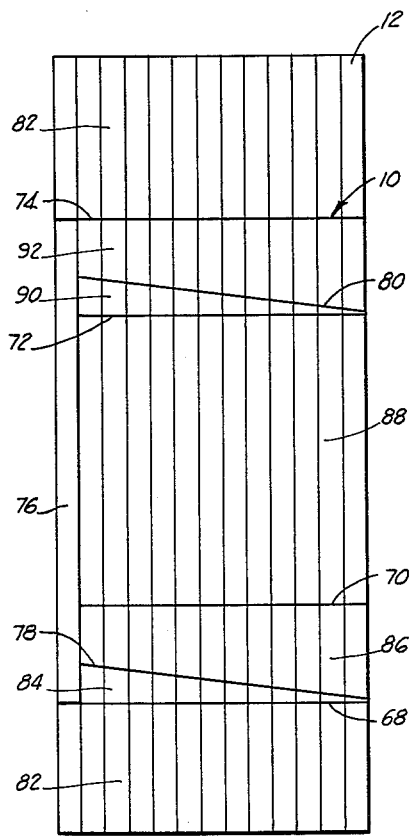
FIGURE 8 is a view similar to FIGURE 4 depicting a modified arrangement for the grooved sleeve.

One type of counterbalanced grooving is commonly known as the conventional rise system, and is particularly disclosed in FIGURES 1 through 7. This type of drum core grooving comprises a continuous combined helical and parallel groove on the outer periphery of the core, and the length of the core is such with respect to the diametric size of the grooves that a full number of grooves, plus one-half groove are necessary to fill the entire longitudinal length thereof. For example, as shown in FIGURES 5 and 6, the length of the core between the drum flanges 14 and 16 is indicated as A. The grooving, generally indicated at 18, extends across the drum between the flanges, but a half groove spacing, shown at 20, remains between the grooving and the drum flange 16. Of course, in portions of the circumferential grooving the half-groove spacing 20 will be adjacent the flange 16, whereas in other portions of the circumferential grooving the half-groove spacing 20 will be adjacent the drum flange 14, as will be hereinafter set forth. Arcuate end filler bars 22 and 24 of any well known type are disposed in the half-grooves for facilitating the cable spooling operation, as is well known.

The conventional rise grooving system comprises a parallel grooved section B extending around substantially half the circumference of the drum core and in communication with a second similar parallel section C through a pair of spaced helical portions D and E. The grooving 18 of the parallel section B extends from the flange 14 across the drum core to the end filler bar 22, which is adjacent the flange 16. The grooving 18 of the parallel section C extends from the flange 16 across the drum core to the end filler bar 24, which is adjacent the flange 14. Of course, the helical section D, communicating between the parallel sections B and C, is of necessity provided with one less groove than the parallel sections in order to provide the cross-over action of the cable (not shown) during the winding operation. However, the helical or cross-over section E contains an equal number of grooves as the parallel sections B and C. Thus, as a cable is being wound on the conventional rise grooving system, the cable moves through the parallel section B, into the helical or cross-over section D, through the parallel section C, into the helical or cross-over section E, and back through the parallel section B. In one complete revolution of the drum, the cable is thus directed from one parallel groove of the grooving 18 into the next succeeding or adjacent parallel groove with a smooth and efficient control of the cable winding operation.

In order to provide the conventional rise grooving system on the outer periphery of substantially any drum core, the parallel grooved sleeve or "master cylinder" 10 of a size complementary to the drum core is selected. As shown in FIGURE 4, the sleeve 10 is cut or split in any suitable manner (not shown) along the longitudinally extending lines indicated at 26, 28, 30 and 32. The sleeve 10 is also cut or split along the canted or diagonal lines indicated at 34 and 36. In this manner, the cylindrical sleeve 10 is divided into several segments, namely: a substantially semi-cylindrical portion 38, a substantially wedge shaped portion 40 adjacent thereto, a second wedge-shaped portion 42, a second substantially semi-cylindrical portion 44, a third wedge-shaped segment 46 similar to the portion 40, and a fourth wedge-shaped segment 48 similar to the portion 42. It is preferable that the portions 40 and 42 be substantially diametrically spaced from the portions 46 and 48, as indicated in FIGURE 1.

Figure 2:
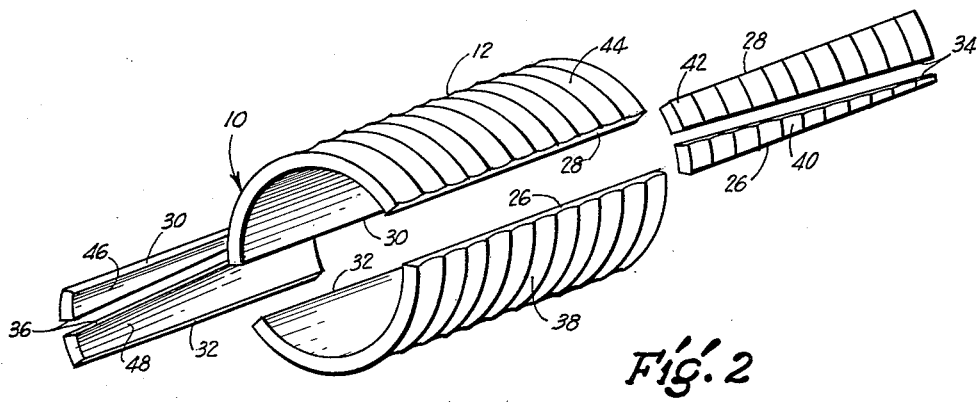
FIGURE 2 is an exploded perspective view of a grooved sleeve as shown in FIGURE 1, and depicting one modification thereof for providing a counterbalanced grooving on a drum core.
Figure 3:
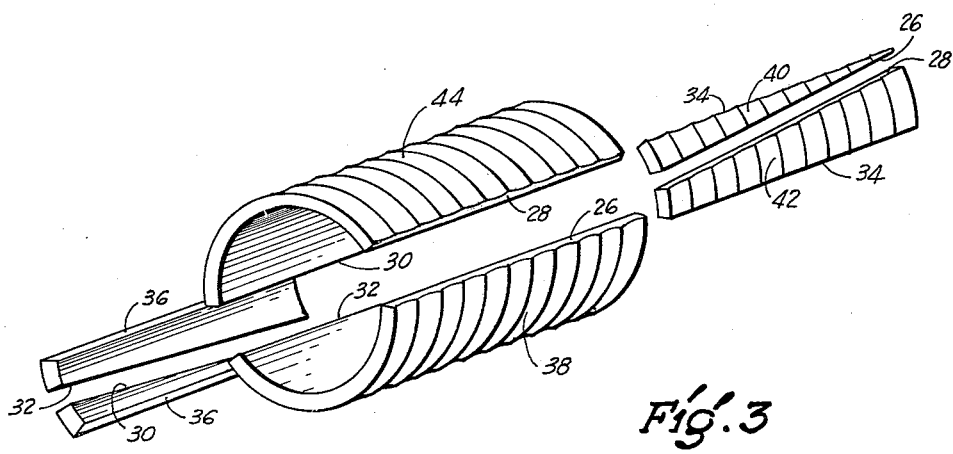
FIGURE 3 is a view similar to FIGURE 2 depicting the segments of the grooved sleeve as re-arranged for attachment to a drum core.

Prior to the cutting or severing of the segments from the cylinder 10, one groove 50 of the grooves 12 is cut away or removed between the lines 26 and 28. Thus, when the severed portions or segments are removed or separated, as shown in FIGURE 2, the segments 40 and 42 will be one groove shorter than the remaining segments.

The severed portions or segments may be removed or separated for re-assembly around the drum core to provide the conventional rise grooving system thereon. The semi-cylindrical portion 38 may be bolted or welded to the outer periphery of the drum core with one side thereof adjacent the flange 14. The second wedge portion or segment 42 is disposed adjacent the section 38 with the cutting line 34 in abutment with the cutting line 26 whereby the right hand groove 52 thereof (FIGURE 5) is in alignment or communication with the right hand groove 54 of the section 38, as viewed in the drawings. The first wedge-shaped segment 40 is then disposed on the drum core adjacent the segment 42 with the cutting line 26 in abutment with the cutting line 28. The wedges 42 and 40 are positioned in mutual alignment and are then welded or otherwise secured to the outer periphery of the drum core.

The second semi-circular segment 44 is then bolted or welded to the periphery of the drum core in such a manner that one side edge thereof is aadjacent the drum flange 16, as shown in FIGURE 5. The fourth wedge-shaped segment 48 is then disposed adjacent the section 48 with the cutting edge 36 in abutment with the cutting edge 30 whereby the grooves will be in mutual alignment, and the third wedge-shaped segment 46 is disposed adjacent the wedge 48 whereby the cutting edge 30 will be in abutment with the cutting edge 32 of the wedge 48 and the cutting edge 36 will be in abutment with the cutting edge 32 of the section 38. The segments may all be bolted or otherwise secured to the core of the drum to provide a continuous circumferential combined helical and parallel groove therearound in accordance with the conventional rise grooving system. Of course, the usual end filler bars 22 and 24 are disposed between the respective flanges 16 and 14 and the segments disposed on the drum core to complete the preparation of the drum for the spooling operation.

Another type of counterbalanced cable spool grooving is called alternate rise grooving system, and is particularly depicted in FIGURES 8 through 11. This type of drum core grooving comprises a continuous combined helical and parallel groove on the outer periphery of the core similar to that in the conventional rise grooving system. However, the length of the drum core between the drum flanges with respect to the diametric size of the grooving is such that a full number of grooves may be provided on the outer periphery of the core between the flanges. Of course, it is preferable to utilize the usual end filler bars, such as shown at 60 and 62 in FIGURE 9, and in order to do this, it is necessary to eliminate one full groove throughout a portion of the circumference of the drum whereby a half-groove spacing may be provided adjacent each drum flange 64 and 66 for receiving the end filler bars. In order to provide the alternate rise grooving system on the outer periphery of a drum core, the parallel grooved sleeve 10 of the desired diameter is selected, and is cut and re-assembled on the drum core in the manner hereinbefore set forth. Of course, it is necessary to cut the sleeve 10 slightly differently to provide this type of grooving.

The cylinder 10 is slit or cut longitudinally along the lines 68, 70, 72 and 74 as set forth in the previous embodiment. One full groove 76 (FIGURE 8) is removed from the sleeve 10 between the cutting lines 68 and 74 prior to the slitting or cutting operation. In addition, the sleeve 10 is cut or slit along the canted or diagonal lines 78 and 80, thus dividing the cylinder 10 into several segments, namely: a substantially semi-cylindrical portion 82, a first wedge-shaped segment 84, a second wedge-shaped segment 86, a second substantially semi-cylindrical section 88, a third wedge-shaped segment 90, and a fourth wedge-shaped segment 92. The severed segments may be separated and rearranged for disposition around the drum core to be provided with the alternate rise grooving system.

Figure 9:
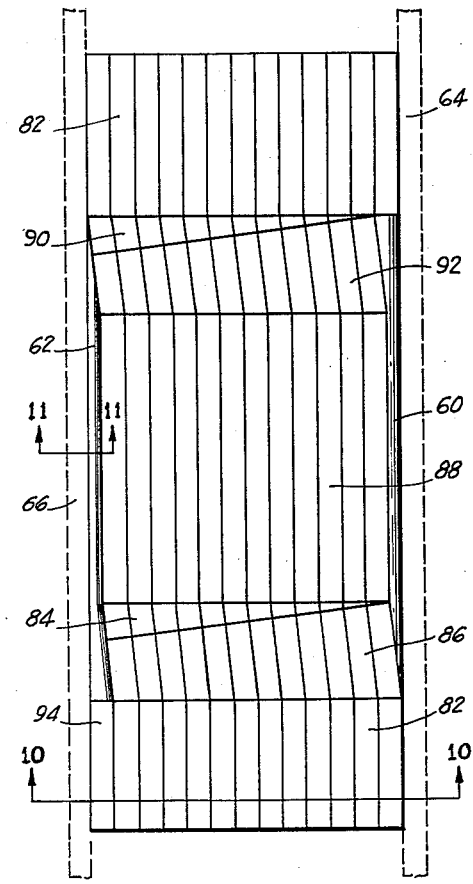
FIGURE 9 is a view similar to FIGURE 5 depicting a spooling drum as assembled from the sleeve depicted in FIGURE 8.
Figure 10:
FIGURE 10 is a sectional view taken on line 10—10 of FIGURE 9.
Figure 11:
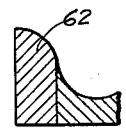
FIGURE 11 is a sectional view taken on line 11—11 of FIGURE 9.
Figure 12:
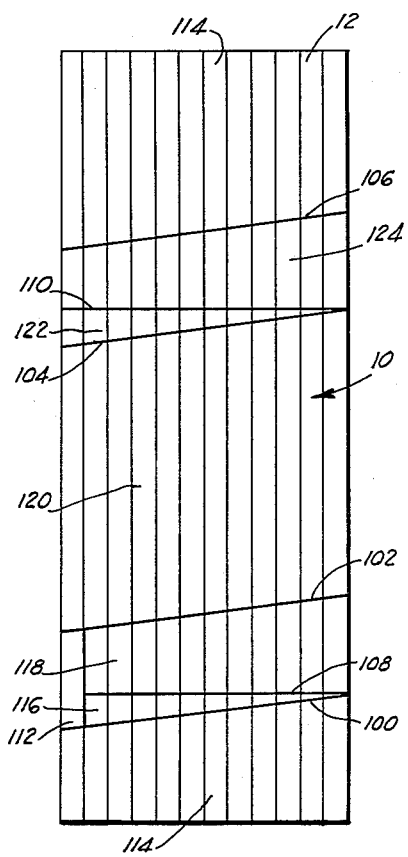
FIGURE 12 is a view similar to FIGURE 4 depicting still another modified arrangement for the grooved sleeve.

The first semi-cylindrical section 82 may be bolted or otherwise secured to the outer periphery of the drum core between the flanges 64 and 66, as clearly shown in FIGURE 9. The second wedge-shaped segment 86 is then disposed adjacent the section 82 with the grooves in mutual alignment and in such a manner that the left hand groove 94 of the section 82 is open. The first wedge-shaped segment 84 is then disposed against the segment 86 and in alignment therewith whereby the second semi-cylindrical portion 88 may be disposed on the drum core adjacent the wedge 84. This combination provides a cross-over of one-half groove width between the first section 82 and the second section 88 as clearly shown in FIGURE 9, and provides a half-groove spacing adjacent each drum flange 64 and 66 for receiving the respective end filler bars 60 and 62.

The fourth wedge-shaped segment 92 is then disposed on the drum core adjacent the section 88, and the third wedge segment 90 is disposed between the wedge 92 and the first semi-cylindrical section 82 for completing the alternate rise grooving system on the drum.

*Conventional Rise—Bias Cross-Over Grooving System*

The conventional rise—bias cross-over grooving system is substantially identical with the conventional rise grooving system and is depicted in FIGURES 12 through 15. Substantially the only difference between the two conventional rise grooving systems is that the standard or straight conventional rise hereinbefore set forth is provided with cross-over sections or areas disposed substantially longitudinally on the drum core in alignment with the longitudinal axis thereof. On the other hand, the conventional rise—bias cross-over grooving is provided with a cross-over section or area which is canted or off-set with respect to the longitudinal axis of the drum core.

Figure 13:
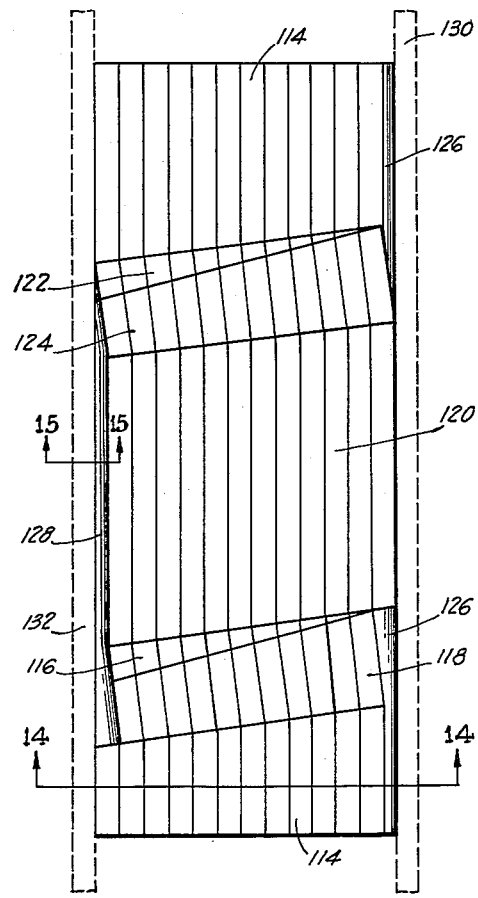
FIGURE 13 is a view similar to FIGURE 5 depicting a spooling drum as assembled from the sleeve depicted in FIGURE 11.
Figure 14:
FIGURE 14 is a sectional view taken on line 14—14 of FIGURE 13.
Figure 15:
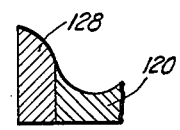
FIGURE 15 is a sectional view taken on line 15—15 of FIGURE 13.
Figure 16:
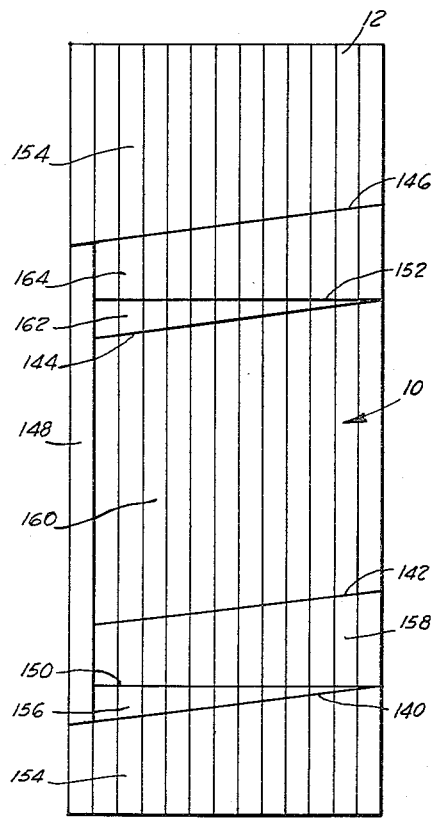
FIGURE 16 is a view similar to FIGURE 4 depicting another modified arrangement for the groove sleeve.
Figure 17:
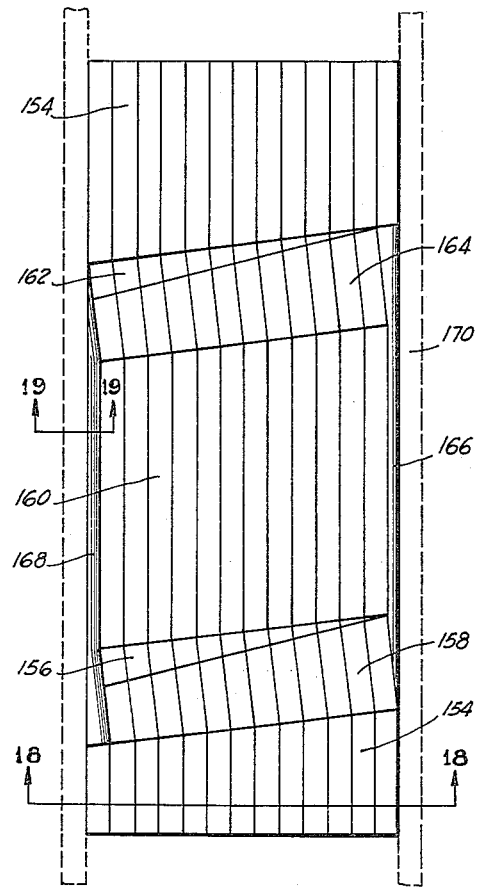
FIGURE 17 is a view similar to FIGURE 5 depicting a spooling drum as assembled from the sleeve depicted in FIGURE 16.
Figure 18:
FIGURE 18 is a sectional view taken on line 18—18 of FIGURE 17.
Figure 19:
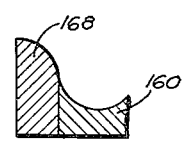
FIGURE 19 is a sectional view taken on line 19—19 of FIGURE 17.

In order to provide the conventional rise—bias cross-over grooving system on a drum core, the desired parallel grooved sleeve 10 is selected and is cut and re-assembled on the drum core as follows:

The sleeve 10 is cut or slit along the canted lines 100, 102, 104 and 106, and in addition, is cut along the substantially longitudinal lines 108 and 110. Prior to the slitting operation, a complete groove 112 is removed between the lines 100 and 102. This cutting operation provides the segments 114, 116, 118, 120, 122 and 124. The severed segments may be separated and re-arranged in the manner as hereinbefore set forth whereby the wedge segments 116 and 118 are interchanged between the semi-cylindrical segments 114 and 120, and the wedge segments 122 and 124 are similarly interchanged between the semi-cylindrical sections 120 and 114, as shown in FIGURE 13. The usual end filler bars 126 and 128 are disposed adjacent the drum flanges 130 and 132, as hereinbefore set forth, and the conventional rise—bias cross-over grooving system may be provided on a drum core.

*Alternate Rise—Bias Cross-Over Grooving System*

The alternate rise—bias cross-over grooving system is substantially identical with the alternate rise grooving system and is depicted in FIGURES 16 through 19. Substantially the only difference between the two alternate rise grooving systems is that the standard or straight alternate rise, hereinbefore set forth, is provided with cross-over sections or cross-over areas disposed substantially longitudinally on the drum core in alignment with the longitudinal axis thereof. On the other hand, the alternate rise—bias cross-over grooving is provided with a cross-over section or cross-over area which is canted or off-set with respect to the longitudinal axis of the drum core.

In order to provide the alternate rise—bias cross-over grooving system on a drum core, the desired parallel grooved sleeve 10 is selected and is cut and re-assembled on the drum core as follows:

The sleeve 10 is cut or slit along the biased or canted lines 140, 142, 144, and 146. One entire groove 148 is removed between the lines 140 and 146, and the sleeve 10 is also cut along the substantially longitudinal lines 150 and 152. In this manner, a plurality of segments are severed, namely, a first substantially semi-cylindrical section 154, a pair of complementary wedge-shaped segments 156 and 158, a second substantially semi-cylindrical section 160, and a second pair of complementary wedge-shaped segments 162 and 164. The severed segments are then re-arranged and bolted or welded to the outer periphery of the drum core in such a manner that the wedge segments 156 and 158 are reversed or interchanged between the semi-cylindrical sections 154 and 160, and the wedge segments 162 and 164 are interchanged between the semi-cylindrical sections 160 and 154.

Of course, the usual end filler bars 166 and 168 may be provided adjacent the drum flanges 170 and 172, respectively, as is well known, and as hereinbefore set forth. In this manner, the alternate rise—bias cross-over section grooving system may be provided on a cable spooling drum, hoisting winch, or the like.

It will be apparent that a grooved drum having a continuous groove thereon comprising a single cross-over section or helical portion in lieu of the two cross-over areas depicted herein may be construed in a similar manner as hereinbefore set forth. In this instance, it may be necessary to cut only one pair of complementary wedge-shaped segments from the master cylinder and to delete a corresponding number of grooves therefrom whereby a grooving system having a single cross-over section may be provided. Of course, in this type of grooving, the cross-over area must move the cable through the width of an entire groove, and the angle of the canted cutting line may be varied in accordance to provide for the full groove width cross-over in lieu of the half-groove cross-over width depicted herein.

By way of summary, the present invention contemplates a novel method of grooving a hoisting drum of any suitable type wherein a "master cylinder" may be utilized to provide a variety of counterbalanced grooving systems. The "master cylinder" comprises a sleeve which may be machined in any well known manner to provide a plurality of parallel grooves on the outer periphery thereof. This type of machining operation is well known, and may be accomplished by the usual lathe, milling machine, or the like, thus eliminating the necessity of specially designed adapters in the construction of the grooved sleeve. The parallel grooved sleeve may then be cut or slit to provide a plurality of arcuate sections or segments, and portions of the segments may be re-arranged and welded or bolted, or the like, to the outer periphery of a drum core in order to provide a continuous helical and parallel groove thereon. The same method of grooving may be utilized to provide substantially any continuous combined helical and parallel groove on a drum, with only the cutting of the sleeve differing in accordance with the particular grooving design desired.

From the foregoing, it will be apparent that the present invention provides a novel method for grooving a spooling drum, or the like, in a manner utilizing conventional machining devices, and greatly reduces the cost and time of manufacture of counterbalanced grooving on the drum. A variety of the types of continuous circumferential grooves comprising combined helical and straight or parallel portions may be provided on a drum core by using a "master cylinder" or parallel grooved drum. The novel grooving method is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. A method of providing a continuous circumferential groove having alternate helical and parallel sections on a drum core, and consisting of providing a plurality of grooves on the outer periphery of a sleeve, severing the grooved sleeve into a plurality of segments, and interchanging certain pairs of the severed segments and securing the interchanged pairs and the remaining segments on the outer periphery of the drum core to provide the continuous alternate helical and parallel circumferential groove.

2. A method of providing a continuous circumferential groove having alternate helical and parallel sections on a drum core, and consisting of providing a plurality of parallel grooves on the outer periphery of a sleeve, severing the parallel grooved sleeve into a plurality of segments, interchanging certain of the severed segments, and securing the interchanged and remaining segments on the outer periphery of the drum core to provide the continuous alternate helical and parallel circumferential groove, and securing the segments to the drum core.

3. A method of providing a continuous circumferential groove having alternate helical and parallel sections on a drum core, and consisting of providing a substantially smooth surface for the outer periphery of the drum core, providing a plurality of parallel grooves on the outer periphery of a master cylinder, severing the master cylinder into a plurality of segments, interchanging certain of the several segments, re-arranging the severed segments and interchanged segments on the smooth outer periphery of the drum core whereby the grooves on the interchanged segments and the remaining segments adjacent thereto are in substantial alignment, and securing the re-arranged segments on the drum core.

4. A method of providing a counterbalanced grooving system on a drum core consisting of utilizing a master cylinder having parallel grooving on the outer periphery thereof, severing the master cylinder to provide a plurality of segments, interchanging certain of the severed segments and securing of the interchanged segments and remaining segments on the drum core to provide the counterbalanced grooving system thereon.

5. A method of providing a counterbalanced grooving system on a drum core consisting of utilizing a sleeve having parallel grooving on the outer periphery thereof, severing the master cylinder to provide at least one pair of complementary wedge-shaped segments, interchanging the wedge-shaped segments, and securing the severed sleeve and interchanged wedge-shaped segments on the drum core to provide the counterbalanced grooving thereon.

6. A method of providing a counterbalanced grooving system on a drum core consisting of providing a plurality of parallel grooves on the outer periphery of a sleeve of a size complementary to the drum core, deleting a portion of at least one groove on the sleeve, severing the sleeve into a plurality of arcuate segments, interchanging certain of the severed arcuate segments and assemblying thereof with the remaining segments around the drum core in accordance with the desired counterbalanced grooving system, and securing the assembled segments to the drum core.

7. A method of providing a counterbalanced grooving system on a drum core consisting of providing a plurality of parallel grooves on the outer periphery of a sleeve of a size complementary of the drum core, severing the grooved sleeve to provide a plurality of substantially semicylindrical sections and at least one pair of complementary wedge-shaped segments, interchanging the wedge-shaped segments, assembling the semi-cylindrical sections and interchanged wedge-shaped segments around the outer periphery of the drum core to provide the desired counterbalanced grooving system thereon, and securing the sections and segments to the drum core.

8. A method of providing a counterbalanced grooving system on a drum core consisting of providing a plurality of parallel grooves on the outer periphery of a sleeve of a size complementary to the drum core, severing the grooved sleeve to provide a plurality of substantially semi-cylindrical sections and at least one pair of complementary wedge-shaped segments, deleting one groove from at least one severed section or segment, interchanging the wedge-shaped segments, assembling the semi-cylindrical sections and interchanged wedge-shaped segments on the outer periphery of the drum core to provide the desired counterbalanced grooving system thereon, and securing the sections and segments to the drum core.

9. A method of providing a continuous circumferential groove having alternate helical and parallel sections on a drum core and consisting of providing a plurality of parallel grooves on the outer periphery of a cylindrical sleeve, cutting at least one pair of complementary wedge-shaped segments from the grooved sleeve, interchanging the wedge-shaped segments, arranging the severed sleeve and interchanged wedge-shaped segments around the outer periphery of the drum core whereby the grooves on the interchanged segments are in substantial alignment with the grooves of the adjacent segments to provide the continuous helical and parallel groove, and securing the severed sleeve and wedge-shaped segments to the drum core.

10. A method of providing a continuous circumferential groove having alternate helical and parallel sections on a drum core and consisting of providing a plurality of parallel grooves on the outer periphery of a cylindrical sleeve, deleting at least a portion of one groove from the sleeve, cutting at least one pair of complementary wedge-shaped segments from the grooved sleeve, interchanging the wedge-shaped segments, arranging the severed sleeve and interchanged wedge-shaped segments around the outer periphery of the drum core whereby the grooves of the interchanged segments are in substantial alignment with the grooves on the sleeve to provide the continuous helical and parallel groove, and securing the severed sleeve and wedge-shaped segments to the drum core.

11. A method of providing a counterbalanced grooving system on a drum core and consisting of providing a plurality of parallel grooves on a master cylinder, severing the grooved master cylinder into a plurality of segments comprising a pair of substantially semi-cylindrical sections and two pairs of complementary wedge-shaped segments, interchanging the complementary wedge-shaped segments of each pair thereof assembling the semi-cylindrical sections and the pairs of interchanged wedge-shaped segments around the outer periphery of the drum core, and securing the sections and segments to the drum core.

12. A method of providing a counterbalanced grooving system on a drum core and consisting of providing a plurality of parallel grooves on a master cylinder, severing the grooved master cylinder into a plurality of segments comprising a pair of substantially semi-cylindrical sections and two pairs of complementary wedge-shaped segments, deleting a groove from at least one of the severed segments of the master cylinder, interchanging the complementary wedge-shaped segments of each pair thereof, assembling the semi-cylindrical sections and pairs of interchanged wedge-shaped segments around the outer periphery of the drum core in a manner whereby the grooves of the interchanged wedge-shaped segments and the adjacent semi-cylindrical sections are in substantial alignment, and securing the assembled sections and segments to the drum core.

13. A method of providing a counterbalanced grooving system on a drum core which consists of providing a plurality of parallel grooves on the outer periphery of a cylindrical sleeve, severing the grooved sleeve along a plurality of spaced longitudinally extending lines to provide a plurality of arcuate sections, severing a portion of the arcuate sections along canted longitudinally extending lines to provide at least one pair of complementary wedge-shaped segments, interchanging the wedge-shaped segments, assembling the arcuate sections and interchanged wedge-shaped segments around the outer periphery of the drum core in a manner to provide a continuous groove between the interchanged wedge-shaped segments and the adjacent arcuate segments, and securing the assembled segments and sections to the drum core.

14. A method of providing a counterbalanced grooving system on a drum core which consists of providing a plurality of parallel grooves on the outer periphery of a cylindrical sleeve, severing the grooved sleeve along a plurality of spaced longitudinally extending lines to provide a plurality of arcuate sections, severing two of the arcuate sections along canted longitudinally extending lines to provide a pair of complementary wedge-shaped segments for each of the two severed arcuate sections, interchanging the wedge-shaped segments of each severed arcuate section, assembling the arcuate sections and pairs of interchanged wedge-shaped segments on the outer periphery of the drum core whereby the grooves of the interchanged wedge-shaped segments are in substantial alignment with the adjacent grooves of the arcuate sections to provide the desired counterbalanced grooving system, and securing the assembled sections and segments to the drum core.

15. A method of providing a counterbalanced grooving system on a drum core which consists of providing a plurality of parallel grooves on the outer periphery of a cylindrical sleeve, severing the grooved sleeve along a plurality of spaced longitudinally extending lines to provide a plurality of arcuate sections, deleting one groove from at least one of the arcuate sections, severing two of the arcuate sections along canted longitudinally extending lines to provide a pair of complementary wedge-shaped segments for each of the two severed arcuate sections, interchanging the wedge-shaped segments of each severed arcuate section, assembling the arcuate sections and pairs of interchanged wedge-shaped segments on the outer periphery of the drum core with the grooves of the arcuate sections and interchanged wedge-shaped segments in substantial alignment to provide the desired counterbalanced grooving system, and securing the assembled sections and segments to the drum core.

References Cited in the file of this patent

UNITED STATES PATENTS

| | | |
|---|---|---|
| 1,985,341 | Fraser | Dec. 25, 1934 |
| 2,620,996 | Le Bus | Dec. 9, 1952 |
| 2,708,080 | Le Bus | May 10, 1955 |
| 2,732,150 | Le Bus | Jan. 24, 1956 |
| 2,734,695 | Le Bus | Feb. 14, 1956 |